(12) United States Patent
Komedani et al.

(10) Patent No.: US 10,282,356 B2
(45) Date of Patent: May 7, 2019

(54) EVALUATING QUALITY OF ANNOTATION

(71) Applicant: INTERNATIONAL BUSINESS MACHINES CORPORATION, Armonk, NY (US)

(72) Inventors: Masaki Komedani, Kanagawa-ken (JP); Ken Kumagai, Tokyo (JP); Takuma Murakami, Tokyo (JP); Akihiro Nakayama, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 255 days.

(21) Appl. No.: 15/063,244

(22) Filed: Mar. 7, 2016

(65) Prior Publication Data
US 2017/0255628 A1    Sep. 7, 2017

(51) Int. Cl.
*G06F 17/30* (2006.01)
*G06F 16/2457* (2019.01)
*G06F 17/24* (2006.01)
*G06F 16/93* (2019.01)

(52) U.S. Cl.
CPC ........ *G06F 16/24578* (2019.01); *G06F 16/93* (2019.01); *G06F 17/241* (2013.01); *G06F 17/245* (2013.01)

(58) Field of Classification Search
CPC .................................................. G06F 17/3053
USPC ....................................................... 707/728
See application file for complete search history.

(56) References Cited

U.S. PATENT DOCUMENTS

| 7,539,934 B2 | 5/2009 | Kender et al. |
| 8,280,719 B2 * | 10/2012 | Miller ................... G06F 17/278 704/9 |
| 8,359,191 B2 * | 1/2013 | Chen ................. G06F 17/30734 704/1 |
| 8,996,983 B2 | 3/2015 | Snijder |
| 2007/0005592 A1 | 1/2007 | Kender et al. |
| 2007/0150802 A1 | 6/2007 | Wan et al. |
| 2008/0098294 A1 | 4/2008 | Le |

(Continued)

OTHER PUBLICATIONS

IBM: List of IBM Patents or Patent Applications Treated as Related (Appendix P), Jul. 27, 2017, pp. 1-2.

(Continued)

*Primary Examiner* — Hicham Skhoun
(74) *Attorney, Agent, or Firm* — Erik K. Johnson (57) ABSTRACT

A method for evaluating annotation quality is provided. The method may include obtaining annotation information associated with a plurality of annotators and a plurality of data elements including a plurality of annotation entries corresponding to at least one data element and entered based on an annotation guideline, determining a quality rating for the annotation guideline based on a comparison between a first value associated with the plurality of annotators and the plurality of data elements and a second value associated with any disparity among the plurality of annotation entries, determining a proficiency rating for an annotator from the plurality of annotators based on a comparison between a third value associated with annotation entries by the annotator and the second value, and generating a report based on the quality rating and the proficiency rating.

11 Claims, 5 Drawing Sheets

(56) References Cited

U.S. PATENT DOCUMENTS

| | | | | |
|---|---|---|---|---|
| 2008/0270120 | A1* | 10/2008 | Pestian | G06F 17/2785 704/9 |
| 2009/0276419 | A1* | 11/2009 | Jones | G06F 17/30637 |
| 2010/0082576 | A1* | 4/2010 | Walker | G06F 17/30038 707/706 |
| 2010/0117092 | A1 | 5/2010 | Koyama | |
| 2010/0153318 | A1* | 6/2010 | Branavan | G06F 17/241 706/12 |
| 2010/0268536 | A1* | 10/2010 | Suendermann | G10L 15/063 704/243 |
| 2011/0093452 | A1* | 4/2011 | Jain | G06F 17/3064 707/723 |
| 2012/0117092 | A1* | 5/2012 | Stankiewicz | G06F 17/30654 707/755 |
| 2014/0304814 | A1* | 10/2014 | Ott | G06F 17/274 726/22 |
| 2015/0019588 | A1* | 1/2015 | Yang | G06F 17/30699 707/776 |
| 2015/0026556 | A1* | 1/2015 | Stadermann | G06F 17/245 715/227 |
| 2016/0147399 | A1 | 5/2016 | Berajawala et al. | |

OTHER PUBLICATIONS

Komedani et al., Pending U.S. Appl. No. 15/660,992, filed Jul. 27, 2017, titled "Evaluating Quality of Annotation," pp. 1-33.

Vittayakorn et al, Quality Assessment for Crowdsourced Object Annotation, Proceedings of the British Machine Vision Conference, pp. 109.1-109.11. BMVA Press, Sep. 2011, (Best date available).

Niowak et al., "How Reliable are Annotations Via Crowdsourcing? A Study About Inter-Annotator Agreement for Multi-Label Image Annotation", The 11th ACM International Conference on Multimedia Information Retrieval (MIR), pp. 29-31, Mar. 2010.

Vittayakorn et al., "Quality Assessment for Crowdsourced Object Annotations", 2011, 11 pages.

Berry, "Design Patterns for Crowdsourced Document Annotation", Jun. 12, 2011,5 pages.

Erk, "Annotation: Quality Testing and Automation", 2013, 5 pages.

Wikipedia, "Fleiss' kappa", https://en.wikipedia.org/wiki/Fleissi'_kappa, printed Feb. 11, 2016, 5 pages.

Wikipedia, "F1 Score", https://en.wikipedia.org/wiki/F1_score, printed Feb. 11, 2016, 2 pages.

* cited by examiner

EVALUATING QUALITY OF ANNOTATION

BACKGROUND

The present invention relates to evaluating quality of an annotation.

In corpus construction, annotations may be manually added in order give a semantic structure to a text document. A plurality of annotators may add annotations according to an annotation guideline. Recently, various techniques have been known regarding evaluating quality of an annotation.

SUMMARY

According to one embodiment, a method for evaluating annotation quality is provided. The method may include obtaining annotation information associated with a plurality of annotators and a plurality of data elements including a plurality of annotation entries corresponding to at least one data element from the plurality of data elements and entered based on an annotation guideline, determining a quality rating for the annotation guideline based on a comparison between a first value associated with the plurality of annotators and the plurality of data elements and a second value associated with any disparity among the plurality of annotation entries, determining a proficiency rating for an annotator from the plurality of annotators based on a comparison between a third value associated with annotation entries by the annotator and the second value associated with any disparity among the plurality of annotation entries, and generating a report based on the quality rating and the proficiency rating.

According to another embodiment, a computer program product for evaluating annotation quality is provided. The computer program product may include at least one computer readable non-transitory storage medium having computer readable program instructions for execution by a processor. The computer readable program instructions may include instructions for obtaining annotation information associated with a plurality of annotators and a plurality of data elements including a plurality of annotation entries corresponding to at least one data element from the plurality of data elements and entered based on an annotation guideline, determining a quality rating for the annotation guideline based on a comparison between a first value associated with the plurality of annotators and the plurality of data elements and a second value associated with any disparity among the plurality of annotation entries, determining a proficiency rating for an annotator from the plurality of annotators based on a comparison between a third value associated with annotation entries by the annotator and the second value associated with any disparity among the plurality of annotation entries, and generating a report based on the quality rating and the proficiency rating.

According to another embodiment, a computer system for evaluating annotation quality is provided. The system may include at least one processing unit, at least one computer readable memory, at least one computer readable tangible, non-transitory storage medium, and program instructions stored on the at least one computer readable tangible, non-transitory storage medium for execution by the at least one processing unit via the at least one computer readable memory. The program instructions may include instructions for obtaining annotation information associated with a plurality of annotators and a plurality of data elements including a plurality of annotation entries corresponding to at least one data element from the plurality of data elements and entered based on an annotation guideline, determining a quality rating for the annotation guideline based on a comparison between a first value associated with the plurality of annotators and the plurality of data elements and a second value associated with any disparity among the plurality of annotation entries, determining a proficiency rating for an annotator from the plurality of annotators based on a comparison between a third value associated with annotation entries by the annotator and the second value associated with any disparity among the plurality of annotation entries, and generating a report based on the quality rating and the proficiency rating.

DETAILED DESCRIPTION

Hereinafter, an exemplary embodiment of the present invention will be described in detail with reference to the attached drawings.

It is to be noted that the present invention is not limited to this exemplary embodiment to be given below and may be implemented with various modifications within the scope of the present invention. In addition, the drawings used herein are for purposes of illustration, and may not show actual dimensions.

For example, to give a semantic structure to a document in corpus construction, annotators may add annotations to document elements constituting the document. The annotations may be categories of the document elements. The document elements may include words, phrases, and sentences. Thus, an annotation "Person" is assumed to be added to a word "Lincoln". Meanwhile, the annotators may be persons who are responsible for adding the annotations to the document elements. In this exemplary embodiment, the annotators are assumed to add the annotations to the document elements according to an annotation guideline as one example of a guideline. The annotation guideline may establish standards regarding what kinds of annotations are to be added to what kinds of document elements.

If an annotation has low quality, this exemplary embodiment may detect whether it is because the annotation guideline has low quality, or because any of the annotators has low proficiency. In addition, if any of the annotators has low proficiency, this exemplary embodiment may detect which annotator has low proficiency.

Figure 1:
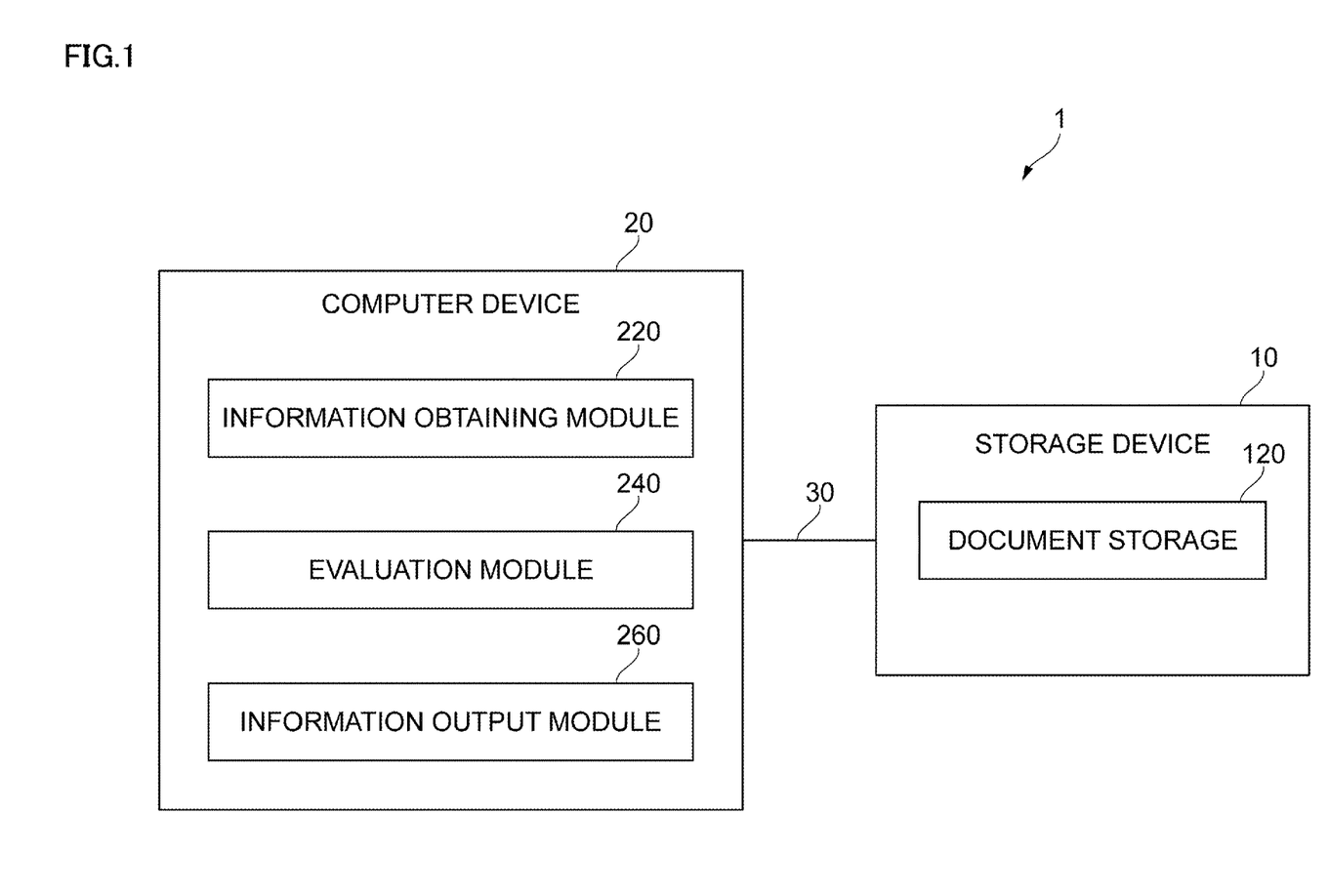
FIG. 1 depicts a block diagram of a computer system according to an exemplary embodiment of the present invention.

Referring to FIG. 1, there is shown a block diagram of a computer system 1 to which the exemplary embodiment is applied. As shown in the figure, the computer system 1 may include a storage device 10 and a computer device 20 connected to each other via a communication line 30.

The storage device 10 may include a document storage 120. The document storage 120 may store document data of documents, such as newspapers, technical papers, or the like. As described above, the document data may include plural document elements. An annotation may be added to any of the plural document elements. Hereinafter, the document elements are also referred to as "tokens". Although the exemplary embodiment takes as an example a case where the document data is stored and the annotations are added to the document elements, the case may be generalized to a case where general data is stored and the annotations are added to data elements included in the general data.

The computer device 20 may include an information obtaining module 220, an evaluation module 240, and an information output module 260.

The information obtaining module 220 may obtain annotation information as one example of first information. The annotation information may indicate which annotator has added which annotation to which token. For example, the information obtaining module 220 may generate the annotation information by analyzing the document stored in the document storage 120. The annotation information may be of any type (e.g., table type information).

The evaluation module 240 may evaluate an annotation based on the annotation information obtained by the information obtaining module 220, if notified that the annotation has low quality as measured by, for example, Inter-Annotator Agreement (IAA). The evaluation module 240 may determine whether the evaluation result shows, as one example of a first evaluation result, that low quality of the annotation guideline has caused the low quality of the annotation, or the evaluation result shows, as one example of a second evaluation result, that low proficiency of any of the annotators has caused the low quality of the annotation. If the evaluation result shows that the low proficiency of any of the annotators has caused the low quality of the annotation, the evaluation module 240 may further determine that the evaluation result shows, as one example of a third evaluation result, that low proficiency of a specific annotator has caused the low quality of the annotation. The details of this determination will be described later. If the evaluation result shows that the low quality of the annotation guideline has caused the low quality of the annotation, the evaluation module 240 may generate support information for supporting revision of the annotation guideline to cause the annotation guideline to have higher quality with respect to annotating. If the evaluation result shows that the low proficiency of a specific annotator has caused the low quality of the annotation, the evaluation module 240 may generate support information for supporting training of the specific annotator to cause the specific annotator to have higher proficiency with respect to annotating.

The information output module 260 may output the evaluation result by the evaluation module 240, as one example of second information. If the evaluation result shows that the low quality of the annotation guideline has caused the low quality of the annotation, the evaluation module 240 may output information to that effect and the support information for supporting revision of the annotation guideline. If the evaluation result shows that the low proficiency of the specific annotator has caused the low quality of the annotation, the evaluation module 240 may output information to that effect and the support information for supporting training of the specific annotator.

Figure 2:
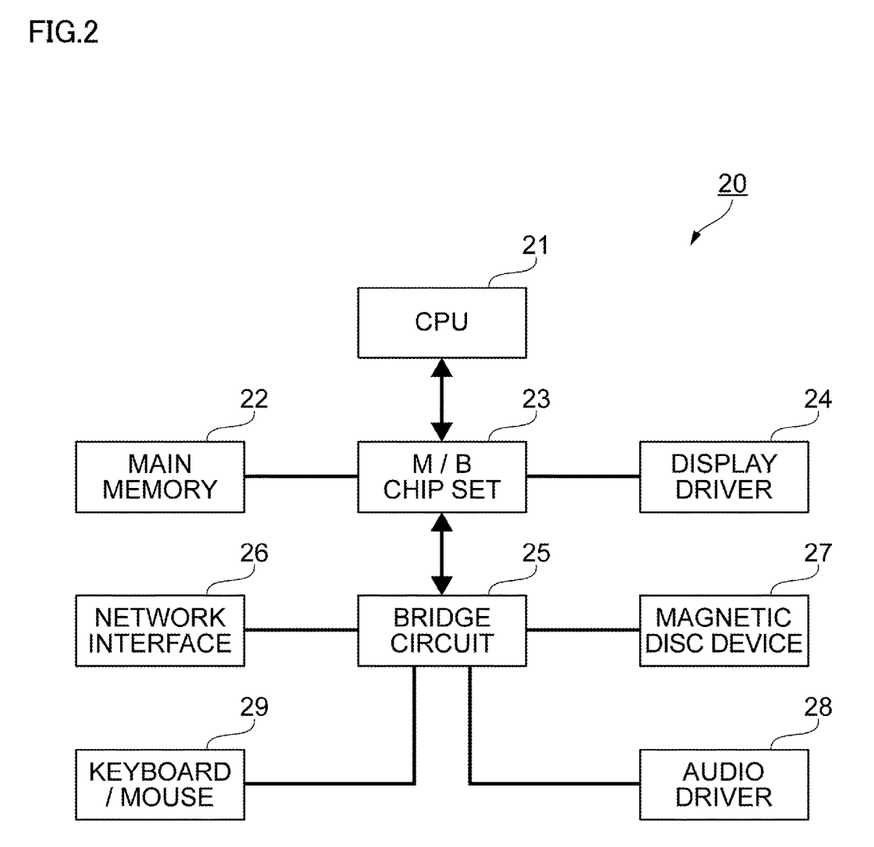
FIG. 2 depicts an example of a hardware configuration of a computer device according to an exemplary embodiment of the present invention.

Referring to FIG. 2, there is shown an example of a hardware configuration of the computer device 20 in the exemplary embodiment. As shown in the figure, the computer device 20 may include a central processing unit (CPU) 21 serving as one example of a processor, a main memory 22 connected to the CPU 21 via a motherboard (M/B) chip set 23 and serving as one example of a memory, and a display driver 24 connected to the CPU 21 via the same M/B chip set 23. A network interface 26, magnetic disk device 27, audio driver 28, and keyboard/mouse 29 are also connected to the M/B chip set 23 via a bridge circuit 25.

In FIG. 2, the various configurational elements are connected via buses. For example, the CPU 21 and the M/B chip set 23, and the M/B chip set 23 and the main memory 22 are connected via CPU buses, respectively. Also, the M/B chip set 23 and the display driver 24 may be connected via an accelerated graphics port (AGP). However, when the display driver 24 includes a PCI express-compatible video card, the M/B chip set 23 and the video card are connected via a PCI express (PCIe) bus. Also, when the network interface 26 is connected to the bridge circuit 25, a PCI Express may be used for the connection, for example. For connecting the magnetic disk device 27 to the bridge circuit 25, a serial AT attachment (ATA), a parallel-transmission ATA, or peripheral components interconnect (PCI) may be used. For connecting the keyboard/mouse 29 to the bridge circuit 25, a universal serial bus (USB) may be used.

Figure 3:
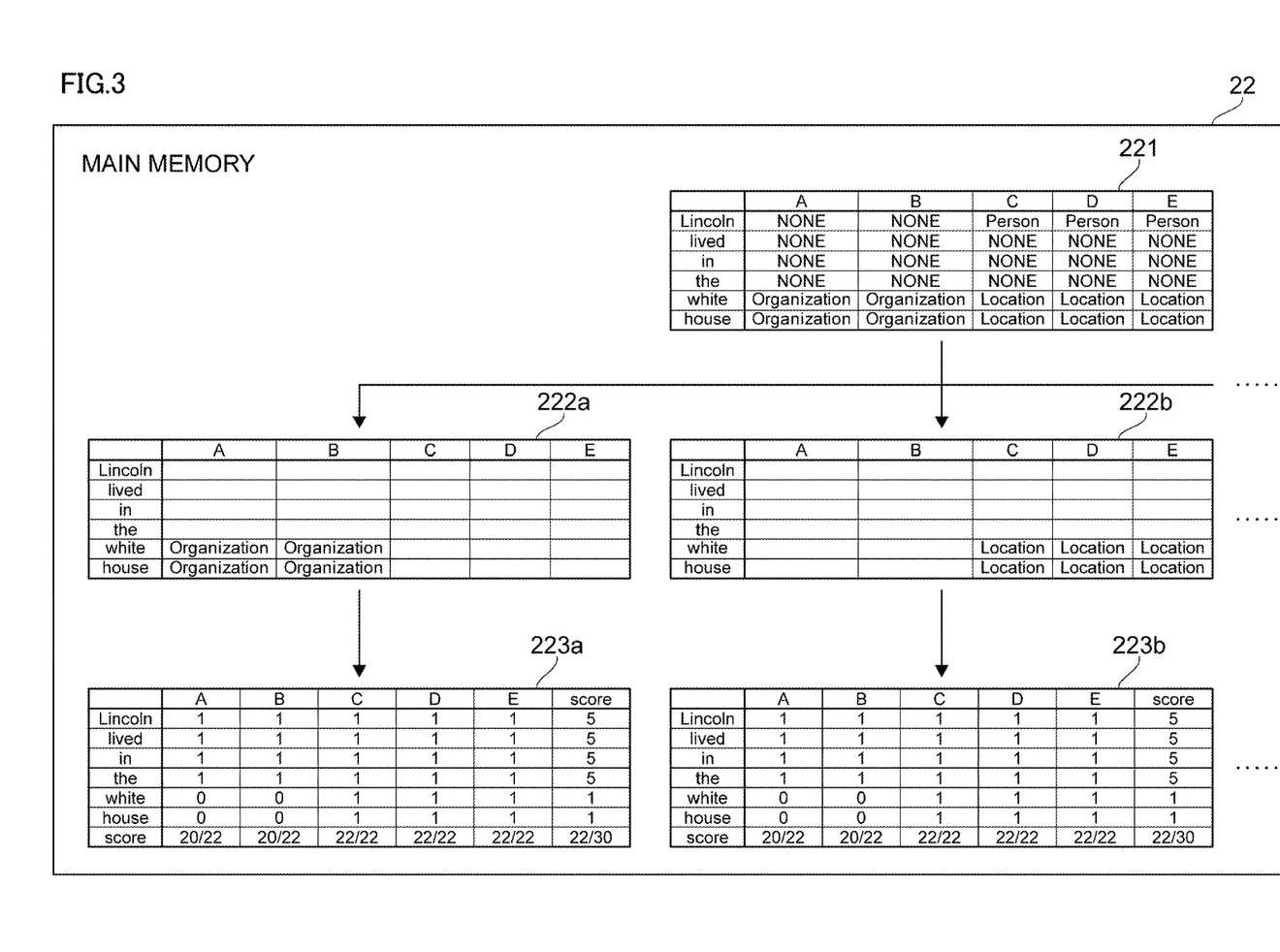
FIG. 3 depicts the first example of evaluation processing according to an exemplary embodiment of the present invention.

Referring to FIG. 3, there is shown the first example of evaluation processing. As shown in the figure, an annotation information table 221, annotation type tables 222a, 222b, ..., and score tables 223a, 223b, ... may be generated in the main memory 22 during the evaluation processing. In the first example, the tokens are assumed to be "Lincoln", "lived", "in", "the", "white", and "house", and the annotators are assumed to be A, B, C, D, and E. Further, in the first example, the annotation types are assumed to be "Organization", "Location", "Person", and "None" (indicating that no annotation is added).

First, the information obtaining module 220 may generate the annotation information table 221. As shown in the figure, the annotation information table 221 may show that the annotators A and B have added the annotation "Organization" to the tokens "white" and "house", and that the annotators C, D, and E have added the annotation "Person" to the token "Lincoln" and the annotation "Location" to the tokens "white" and "house".

Next, the evaluation module 240 may generate, for each of the annotation types, corresponding one of the annotation type tables 222a, 222b, ... from the annotation information table 221. For example, an annotation type table 222a may be generated for the annotation type "Organization", and an annotation type table 222b may be generated for the annotation type "Location".

Subsequently, the evaluation module 240 may generate the score tables 223a, 223b, ... from the annotation type tables 222a, 222b, ..., respectively. For example, a score table 223a may be generated from the annotation type table 222a, and a score table 223b may be generated from the annotation type table 222b. Explanations are made below regarding the evaluating processing, taking as an example a case where the score table 223a is generated from the annotation type table 222a.

The evaluation module 240 may divide the annotators A to E, for each token, into two groups including a group of one or more annotators who have added the annotation "Organization" to the token and a group of one or more annotators who have not added the annotation "Organization" to the token. Note that, if no annotator has added the annotation "Organization" to the token or all annotators A to E have added the annotation "Organization" to the token, the annotators A to E may be included in one group while no annotator may be included in the other group. Then, the evaluation module 240 may store "1" in one or more cells in the score table 223a, each corresponding to an annotator belonging to a group (hereinafter referred to as "majority") including the majority of the annotators in the two groups, and store "0" in one or more cells in the score table 223a, each corresponding to an annotator belonging to the other group (hereinafter referred to as "minority") including the minority of the annotators in the two groups. If the number of annotators who have added the annotation "Organization" to the token and the number of annotators who have not added the annotation "Organization" to the token are equal, the evaluation module 240 may store "1" in one or more cells in the score table 223a, each corresponding to an annotator belonging to any one of the two groups.

After that, the evaluation module 240 may calculate a TokenScore indicating a score for each token by using the following formula: TokenScore=(the number of annotators belonging to the majority for the token)−(the number of annotators belonging to the minority for the token). If the number of annotators belonging to the majority for the token and the number of annotators belonging to the minority for the token are equal, the evaluation module 240 may set the TokenScore to 0. For each of the tokens "Lincoln", "lived", "in", and "the", "1" is stored in five cells and "0" is stored in no cell. Thus, the TokenScore for each of the tokens "Lincoln", "lived", "in", and "the" is set to 5 (from the second row to the fifth row in the rightmost column of the score table 223a). For each of the tokens "white" and "house", "1" is stored in three cells and "0" is stored in two cells. Thus, the TokenScore for each of the tokens "white" and "house" is set to 1 (the sixth row and the seventh row in the rightmost column of the score table 223a).

Further, the evaluation module 240 may calculate a GuidelineScore indicating a score of an annotation guideline by using the following formula: GuidelineScore=(the total sum of TokenScores)/((the number of annotators)*(the number of tokens)). The GuidelineScore may take a value from 0 to 1. For example, in the score table 223a, the TokenScores for the tokens "Lincoln", "lived", "in", "the", "white", and "house" are 5, 5, 5, 5, 1, and 1, respectively, and the numbers of annotators and tokens are 5 and 6, respectively. Thus, the GuidelineScore is set to 22/30 (the lowermost row in the rightmost column of the score table 223a). However, the foregoing formula is one example, and any formula may be used if it calculates a score by comparing, for each token, the number of annotators who have added the annotation to the token and the number of annotators who have not added the annotation to the token.

Furthermore, the evaluation module 240 may calculate an AnnotatorScore indicating a score for each annotator by using the following formula: AnnotatorScore=(the total sum of TokenScores of tokens for which the annotator belongs to the majority)/(the total sum of TokenScores). Specifically, the evaluation module 240 may first calculate an AnnotatorBaseScore indicating a base score of the annotator by using the following formula: AnnotatorBaseScore=(the total sum of TokenScores of tokens for which the annotator belongs to the majority)/((the number of annotators)*(the number of tokens)). Next, the evaluation module 240 may normalize the AnnotatorBaseScore by dividing the AnnotatorBaseScore by the GuidelineScore to obtain the AnnotatorScore. The AnnotatorScore may take a value from 0 to 1, and this enables to set a threshold by using a proportion. For example, in the score table 223a, the tokens for which the annotator A belongs to the majority are "Lincoln", "lived", "in", and "the", and the TokenScores for these tokens are all 5. In addition, the total sum of the TokenScores is 22. Thus, the AnnotatorScore of the annotator A is set to 20/22 (the lowermost row in the column corresponding to the annotator A of the score table 223a). However, the foregoing formula is one example, and any formula may be used if it calculates a score by comparing, for each token, whether or not the annotator has added the annotation to the token and whether or not a majority of the annotators has added the annotation to the token.

After that, the evaluation module 240 may determine whether or not the annotation guideline has low quality. Specifically, the evaluation module 240 may determine whether or not the GuidelineScore is greater than or equal to a threshold for GuidelineScores (e.g., 0.8). If the GuidelineScore is greater than or equal to the threshold, the evaluation module 240 may determine that the annotation guideline has high quality. On the contrary, if GuidelineScore is smaller than the threshold, the evaluation module 240 may determine that the annotation guideline has low quality.

Further, the evaluation module 240 may determine whether or not an annotator has low proficiency. Specifically, the evaluation module 240 may determine whether or not the AnnotatorScore of the annotator is greater than or equal to a threshold for AnnotatorScores (e.g., 0.8). If the AnnotatorScore is greater than or equal to the threshold, the evaluation module 240 may determine that the annotator has high proficiency. On the contrary, if the AnnotatorScore is smaller than the threshold, the evaluation module 240 may determine that the annotator has low proficiency.

Note that the aforementioned thresholds may be set by a project manager or the like as fixed values in accordance with experiences in past projects and quality required in the present project.

In the first example, as for the score table 223a, the evaluation module 240 may determine that the GuidelineScore (22/30=0.73) is smaller than the threshold for GuidelineScores (0.8). Therefore, the evaluation module 240 may determine that the annotation guideline has low quality regarding the annotation type "Organization". As a result, the information output module 260 may output information indicating that the annotation guideline has low quality.

Furthermore, in the first example, the evaluation module 240 may support revision of the annotation guideline. If the annotation guideline has been determined to have low quality, the evaluation module 240 may provide such support, for each annotation type.

The evaluation module 240 may support revision of the annotation guideline in two manners.

In the first manner, the evaluation module 240 may specify one or more tokens corresponding to annotating by any of the annotators belonging to the minority. Concerning each of the one or more tokens, the evaluation module 240 may count, for each of the annotation types, the number of annotators who have added the annotation of the annotation type. For example, in the annotation type tables 222a and 222b, the tokens corresponding to annotating by any of the annotators belonging to the minority are "white" and "house". Thus, concerning each of the tokens "white" and "house", the evaluation module 240 may count the number of annotators who have added the annotation "Organization" to find that the number is two, and count the number of annotators who have added the annotation "Location" to find that the number is three. As a result, the information output module 260 may output information about these counts for each of the one or more tokens to an editor or the like of the annotation guideline.

If the number of tokens corresponding to annotating by any of the annotators belonging to the minority is large, the information output module 260 may output information about such counts only for each token satisfying the following condition: (TokenScore for the token)/(the number of annotators)<(the threshold for GuidelineScores). Satisfying this condition indicates that the TokenScore for the token is relatively low, namely that annotations of various annotation types have been added to the token.

In the second manner, the evaluation module 240 may specify one or more easily-confused pairs of annotation types. Specifically, the evaluation module 240 may assume a TokenScore for a token as an element of an integer vector, for each of the two annotation types. The evaluation module 240 may calculate similarity between the integer vector for one annotation type and the integer vector for the other annotation type. The cosine value of an angle made by the two integer vectors may be used to represent the similarity between the two integer vectors. The evaluation module 240 may specify an easily-confused pair of the annotation types based on the similarity between the two integer vectors. For example, in the score tables 223a and 223b, both of the integer vector for the annotation type "Organization" and the integer vector for the annotation type "Location" are vectors (5, 5, 5, 5, 1, 1), and the cosine value is 1. As a result, the information output module 260 may output information about easily-confused pairs of annotation types to an editor or the like of the annotation guideline.

Figure 4:
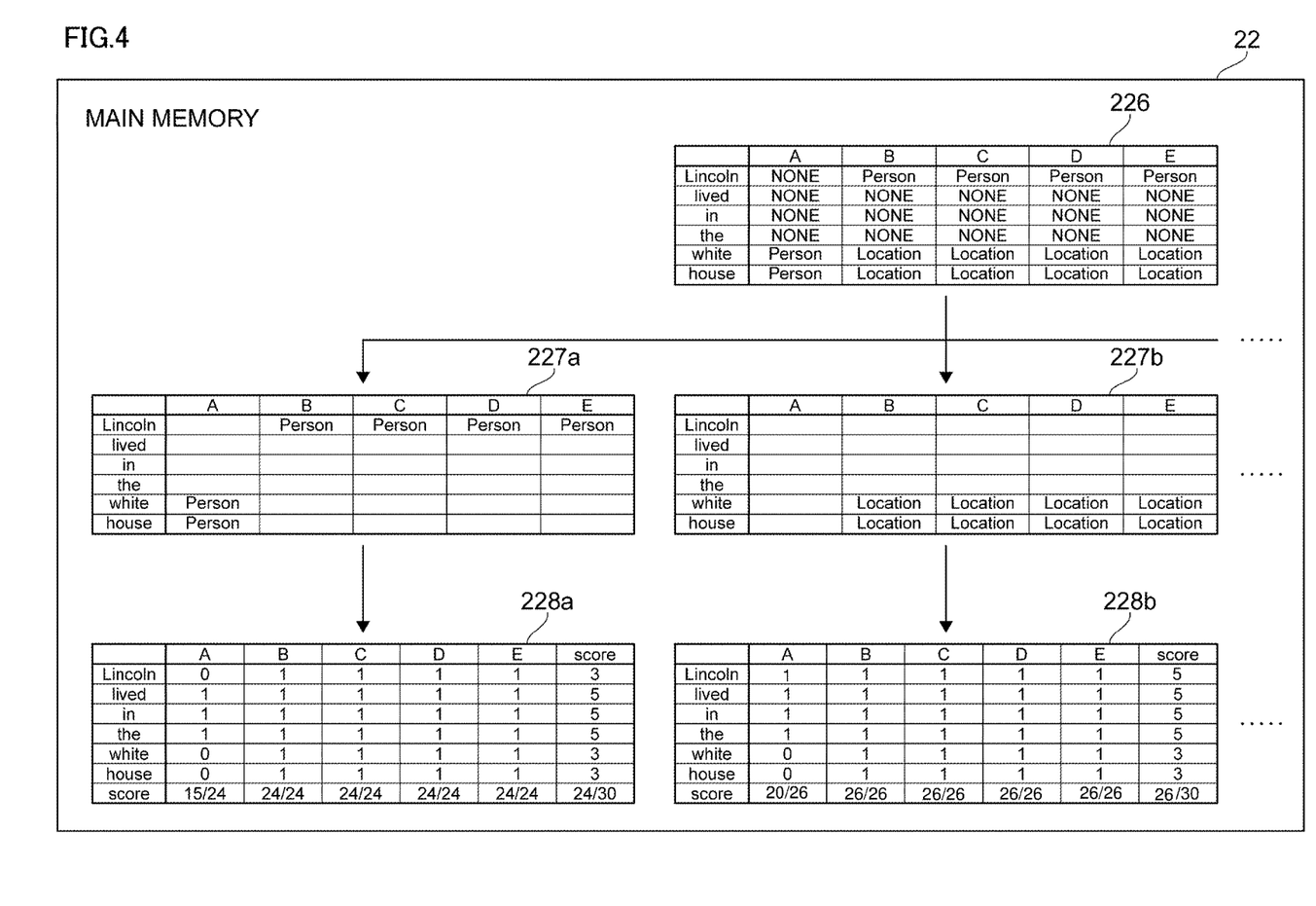
FIG. 4 depicts the second example of evaluation processing according to an exemplary embodiment of the present invention.

Referring to FIG. 4, there is shown the second example of evaluation processing. As shown in the figure, an annotation information table 226, annotation type tables 227a, 227b, . . . , and score tables 228a, 228b, . . . may be generated in the main memory 22 during the evaluation processing. Also in the second example, the tokens are assumed to be "Lincoln", "lived", "in", "the", "white", and "house", and the annotators are assumed to be A, B, C, D, and E. Further, in the second example, the annotation types are assumed to be "Person", "Location", and "None" (indicating that no annotation is added).

First, the information obtaining module 220 may generate the annotation information table 226. As shown in the figure, the annotation information table 226 may show that the annotators A has added the annotation "Person" to the tokens "white" and "house", and that the annotators B, C, D, and E have added the annotation "Person" to the token "Lincoln" and the annotation "Location" to the tokens "white" and "house".

Next, the evaluation module 240 may generate, for each of the annotation types, corresponding one of the annotation type tables 227a, 227b, . . . from the annotation information table 226. For example, an annotation type table 227a may be generated for the annotation type "Person", and an annotation type table 227b may be generated for the annotation type "Location".

Subsequently, the evaluation module 240 may generate the score tables 228a, 228b, . . . from the annotation type tables 227a, 227b, . . . , respectively. For example, a score table 228a may be generated from the annotation type table 227a, and a score table 228b may be generated from the annotation type table 227b. Explanations are made below regarding the evaluating processing, taking as an example a case where the score table 228a is generated from the annotation type table 227a.

The evaluation module 240 may divide the annotators A to E, for each token, into two groups including a group of one or more annotators who have added the annotation "Person" to the token and a group of one or more annotators who have not added the annotation "Person" to the token. Note that, if no annotator has added the annotation "Person" to the token or all annotators A to E have added the annotation "Person" to the token, the annotators A to E may be included in one group while no annotator may be included in the other group. Then, the evaluation module 240 may store "1" in one or more cells in the score table 228a, each corresponding to an annotator belonging to the majority of the two groups, and store "0" in one or more cells in the score table 228a, each corresponding to an annotator belonging to the minority of the two groups. If the number of annotators who have added the annotation "Person" to the token and the number of annotators who have not added the annotation "Person" to the token are equal, the evaluation module 240 may store "1" in one or more cells in the score table 228a, each corresponding to an annotator belonging to any one of the two groups.

After that, the evaluation module 240 may calculate a TokenScore indicating a score for each token, in the same manner as in the first example. For each of the tokens "Lincoln", "white", and "house", "1" is stored in four cells and "0" is stored in one cell. Thus, the TokenScore for each of the tokens "Lincoln", "white", and "house" is set to 3 (the second row, the sixth row and the seventh row in the rightmost column of the score table 228a). For each of the tokens "lived", "in", and "the", "1" is stored in five cells and "0" is stored in no cell. Thus, the TokenScore for each of the tokens "lived", "in", and "the" is set to 5 (from the third row to the fifth row in the rightmost column of the score table 228a).

Further, the evaluation module 240 may calculate a GuidelineScore indicating a score of an annotation guideline, in the same manner as in the first example. For example, in the score table 228a, the TokenScores for the tokens "Lincoln", "lived", "in", "the", "white", and "house" are 3, 5, 5, 5, 3, and 3, respectively, and the numbers of annotators and tokens are 5 and 6, respectively. Thus, the GuidelineScore is set to 24/30 (the lowermost row in the rightmost column of the score table 228a).

Furthermore, the evaluation module 240 may calculate an AnnotatorScore indicating a score for each annotator, in the same manner as in the first example. For example, in the score table 228a, the tokens for which the annotator A belongs to the majority are "lived", "in", and "the", and the TokenScores for these tokens are all 5. In addition, the total sum of the TokenScores is 24. Thus, the AnnotatorScore of the annotator A is set to 15/24 (the lowermost row in the column corresponding to the annotator A of the score table 228a).

After that, the evaluation module 240 may determine whether or not the annotation guideline has low quality. Specifically, the evaluation module 240 may determine whether or not the GuidelineScore is greater than or equal to a threshold for GuidelineScores (e.g., 0.8). If the GuidelineScore is greater than or equal to the threshold, the evaluation module 240 may determine that the annotation guideline has high quality. On the contrary, if the GuidelineScore is smaller than the threshold, the evaluation module 240 may determine that the annotation guideline has low quality.

Further, the evaluation module 240 may determine whether or not an annotator has low proficiency. Specifically, the evaluation module 240 may determine whether or not the AnnotatorScore of the annotator is greater than or equal to a threshold for AnnotatorScores (e.g., 0.8). If the AnnotatorScore is greater than or equal to the threshold, the evaluation module 240 may determine that the annotator has high proficiency. On the contrary, if the AnnotatorScore is smaller than the threshold, the evaluation module 240 may determine that the annotator has low proficiency.

In the second example, as for the score table 228*a*, the evaluation module 240 may determine that the GuidelineScore (24/30=0.8) is equal to the threshold for GuidelineScores (0.8). Therefore, the evaluation module 240 may determine that the annotation guideline has high quality regarding the annotation type "Person". Further, the evaluation module 240 may determine that the AnnotatorScore of the annotator A (15/24=0.625) is smaller than the threshold for AnnotatorScores (0.8). Therefore, the evaluation module 240 may determine that the annotator A has low proficiency regarding the annotation type "Person". As a result, the information output module 260 may output information indicating that the annotation guideline has high quality and the annotator A has low proficiency.

Furthermore, in the second example, the evaluation module 240 may support training of one or more annotators having low proficiency (hereinafter also referred to as "unskilled annotators"). If an annotator has been determined to be unskilled, the evaluation module 240 may provide such support to the unskilled annotator, for each annotation type.

The evaluation module 240 may specify one or more tokens corresponding to annotating by the unskilled annotator belonging to the minority. Concerning each of the one or more tokens, the evaluation module 240 may check all annotation type tables 227*a*, 227*b*, . . . , and specify an annotation type the annotation of which has been added by annotators belonging to the majority. For example, in the annotation type tables 227*a* and 227*b*, the tokens corresponding to annotating by the annotator A belonging to the minority are "white" and "house". Thus, concerning each of the tokens "white" and "house", the evaluation module 240 may specify the annotation type "Location" as an annotation type the annotation of which has been added by annotators belonging to the majority. As a result, the information output module 260 may output information about the specified annotation type for each of the one or more tokens to the unskilled annotator or the like.

Figure 5:
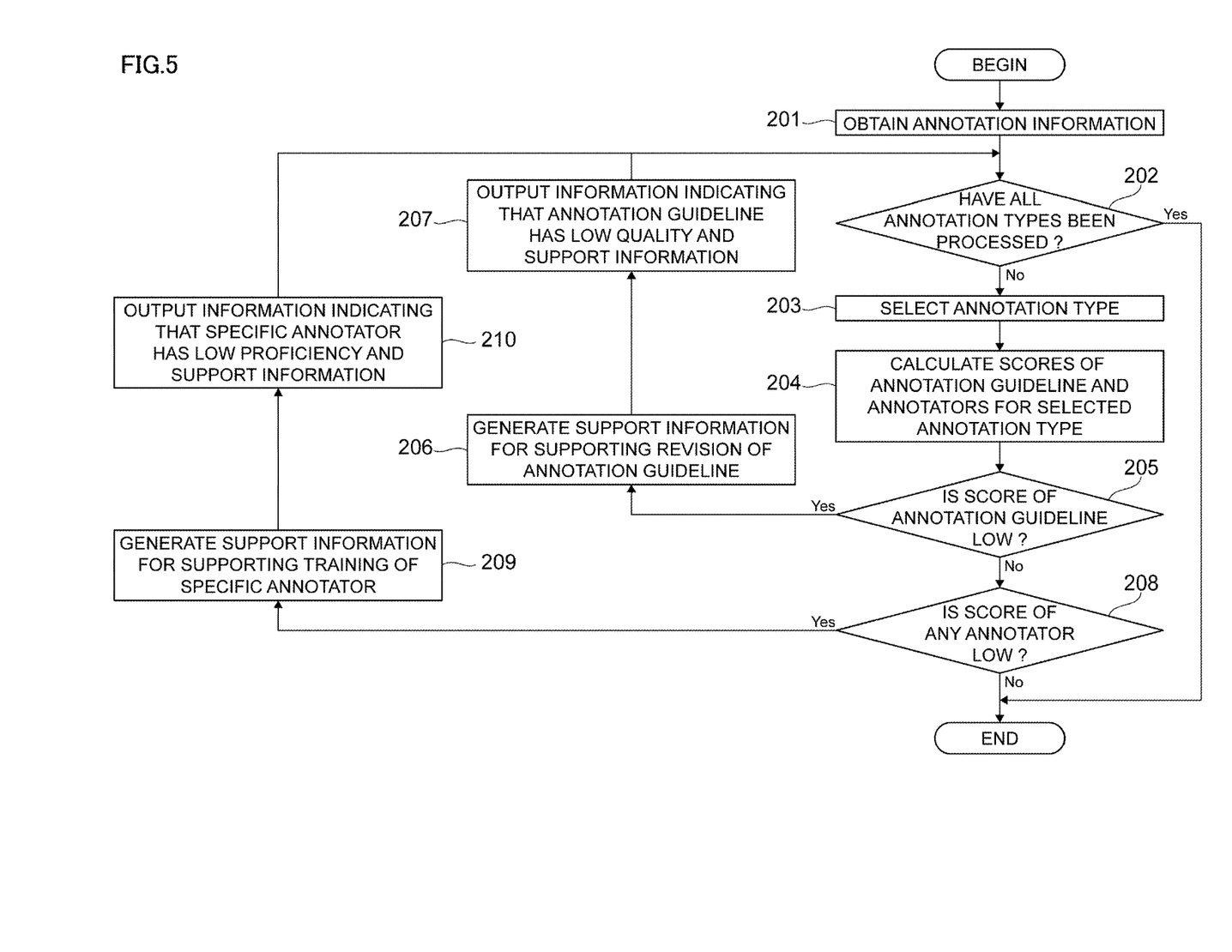
FIG. 5 depicts a flowchart representing an example of an operation performed by a computer device according to an exemplary embodiment of the present invention.

Referring to FIG. 5, there is shown a flowchart representing an example of an operation performed by the computer device 20. In the foregoing description, the operation is assumed to start when notified that the annotation has low quality as measured by the IAA. However, in the following description, the operation is assumed to start even when not notified that the annotation has low quality as measured by the IAA. For example, the operation may start when an operation request is received or a predetermined timing is reached.

When the operation starts in the computer device 20, the information obtaining module 220 may obtain annotation information based on document data stored in the document storage 120 (step 201). For example, the information obtaining module 220 may generate the annotation information table (e.g., 221 or 226) by analyzing the document data.

Next, the evaluation module 240 may determine whether or not all annotation types have been processed (step 202). If all annotation types have not been processed, the evaluation module 240 may select an annotation type from annotation types which have not been processed (step 203). After that, the evaluation module 240 may calculate a score of the annotation guideline and scores of the annotators for the selected annotation type (step 204). For example, the evaluation module 240 may calculate the GuidelineScore indicating a score of the annotation guideline and AnntatorScores indicating scores of the annotators, as described above with reference to FIGS. 3 and 4.

Thus, the evaluation module 240 may determine whether or not a score of the annotation guideline is low (step 205). For example, the evaluation module 240 may determine whether or not the GuidelineScore is greater than or equal to the threshold for GuidelineScores. If the score of the annotation guideline is low, the evaluation module 240 may generate support information for supporting revision of the annotation guideline (step 206). For example, the evaluation module 240 may generate information indicating the number of annotators who have added the annotation of each annotation type to the tokens corresponding to annotating by any of the annotators belonging to the minority. Alternatively, the evaluation module 240 may generate information indicating easily-confused pairs of annotation types. After that, the information output module 260 may output information indicating that the annotation guideline has low quality, and the support information generated at step 206 (step 207).

If, at step 205, the score of the annotation guideline is not low, the evaluation module 240 may determine whether or not a score of any annotator is low (step 208). For example, the evaluation module 240 may determine whether or not any AnotatorScore is greater than or equal to the threshold for AnotatorScore. If the score of a specific annotator is low, the evaluation module 240 may generate support information for supporting training of the specific annotator (step 209). For example, the evaluation module 240 may generate information indicating an annotation type the annotation of which has been added by annotators belonging to the majority to each of the tokens corresponding to annotating by the specific annotator belonging to the minority. After that, the information output module 260 may output information indicating that the specific annotator has low proficiency, and the support information generated at step 209 (step 210).

The operation above is repeated until all annotation types are processed. If, at step 202, all annotation types have been processed, the operation ends.

In one embodiment, a method for evaluating annotation quality may include obtaining annotation information associated with a plurality of annotators and a plurality of data elements (e.g., tokens, words in a sentence). The annotation information may include a plurality of annotation entries corresponding to at least one data element from the plurality of data elements, and the plurality of annotation entries may be entered based on an annotation guideline. The method may also include determining a quality rating for the annotation guideline, and the determining may be based on a comparison between a first value associated with the plurality of annotators and the plurality of data elements and a second value associated with any disparity among the plurality of annotation entries. In one example, a disparity may include differences between types of annotation entries (e.g., "Organization" versus "Location", as depicted in FIG. 3, annotation information table 221) and whether an annotation has been entered or not (e.g., "Person" versus "NONE", as depicted in FIG. 3, annotation information table 221). The method may also include determining a proficiency rating for an annotator from the plurality of annotators, and the determining may be based on a comparison between a third value associated with annotation entries by the annotator and the second value associated with any disparity among the plurality of annotation entries. The method may also include generating a report based on the quality rating and the proficiency rating.

In an embodiment, the generated report may indicate whether the quality rating is sufficient or insufficient based on a threshold value and/or whether the proficiency rating is sufficient or insufficient based on another threshold value. In an embodiment, a sufficient quality rating or a sufficient proficiency rating may lead to a minimal or blank result provided in the generated report. In another embodiment, the report may be generated based on a determination that the quality rating and/or proficiency rating is below a threshold value. In an embodiment, based on a determination that the quality rating is below a threshold, the generated report may include information supporting revision to the annotation guideline, which may be used to improve the annotation guideline by correcting aspects of the annotation guideline associated with the poor quality rating. In an embodiment, based on a determination that the proficiency rating is below a threshold, the generated report may include information supporting training for a particular annotator, which may be used to improve the annotation proficiency for the particular annotator.

In one embodiment, the method may further include determining whether an annotation has been entered for each data element from the plurality of data elements by each annotator from the plurality of annotators. In one example, with reference to annotation information table 221 (depicted in FIG. 3), the value "NONE" indicates that various data elements (e.g., tokens) do not have any annotation entered by a particular annotator.

In a further embodiment, the method may include generating a plurality of annotation type tables based on the plurality of annotation entries. The plurality of annotation entries includes multiple types of annotation entries, and each of the plurality of annotation type tables corresponds to one of the multiple types of annotation entries. In one example, the annotation type tables may resemble annotation type tables 222a, 222b, depicted in FIG. 3. The method may also include generating a plurality of score tables based on the plurality of annotation type tables including a plurality of element scores, and each element score from the plurality of element scores is associated with a particular data element from the plurality of data elements and is based on whether an annotation has been entered for the particular data element by each annotator from the plurality of annotators. In one example, the score tables may resemble score tables 223a, 223b, depicted in FIG. 3.

In one embodiment, determining the quality rating comprises determining a ratio between the first value and the second value, and wherein determining the proficiency rating comprises determining a ratio between the second value and the third value. In a further embodiment, the first value, the second value, and the third value are based on the plurality of score tables. In one example, with reference to score table 223a, depicted in FIG. 3, the quality rating may be represented by a fraction in the bottom row in the rightmost cell with the first value being the denominator and the second value being the numerator, and the proficiency rating for annotator "A" may be represented by a fraction in the bottom row of the "A" column with the second value being the denominator and the third value being the numerator.

In a further embodiment, each score table from the plurality of score tables includes a plurality of cells corresponding to a first data element and each annotator from the plurality of annotators, each cell from the plurality of cells has a value based on whether an annotation has been entered for the first data element by each annotator from the plurality of annotators, and the element score for the first data element is based on a difference between a number of cells from the plurality of cells having a first cell value and a number of cells from the plurality of cells having a second cell value.

A difference may include a difference between types of annotation entries (e.g., "Organization" versus "Location", as depicted in FIG. 3, annotation information table 221) and/or a difference with respect to an annotation having been entered or not (e.g., "Person" versus "NONE", as depicted in FIG. 3, annotation information table 221). In one embodiment, the first cell value may be associated with a majority of cells corresponding to the first data element and the second cell value may be associated with a minority of cells corresponding to the first data element.

In one embodiment, the method may further include determining the quality rating is below a threshold value, and generating information associated with the quality rating supporting revisions to the annotation guideline. Such information may include data elements (e.g., tokens) that may have insufficient annotation quality due to poor guidance from the annotation guideline. Such information may be included in the generated report.

In one embodiment, the method may further include determining the proficiency rating for a particular annotator is below a threshold value, and generating information associated with proficiency rating supporting training for the particular annotator. Such information may be included in the generated report.

In another embodiment, a method for evaluating annotation quality may include obtaining annotation information (e.g., a first information) indicating whether or not each of a plurality of annotators has added the annotation to each of a plurality of data elements, and outputting other information (e.g., a second information) indicating at least either one of a first evaluation result and a second evaluation result, the first evaluation result showing that a guideline for annotating has low quality with respect to annotating, the second evaluation result showing that any of the plurality of annotators has low proficiency with respect to annotating.

In further embodiments, the method may further include obtaining the first evaluation result by comparing, for each data element of the plurality of data elements, a number of one or more annotators who have added the annotation to the each data element and a number of one or more annotators who have not added the annotation to the each data element. The method may further include outputting information for supporting revision of the guideline to cause the guideline to have higher quality with respect to annotating, in a case where the second information indicates the first evaluation result.

In further embodiments, the second information may indicate a third evaluation result showing that a specific annotator of the plurality of annotators has low proficiency, in a case where the second information indicates the second evaluation result. The method may further include obtaining the third evaluation result by comparing, for each data element of the plurality of data elements, whether or not the specific annotator has added the annotation to the each data element and whether or not a majority of the plurality of annotators has added the annotation to the each data element. The method may further include outputting information for supporting training of the specific annotator to cause the specific annotator to have higher proficiency with respect to annotating, in a case where the second information indicates the second evaluation result.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for evaluating and providing annotation quality, the method comprising:
    obtaining annotation information associated with a plurality of annotators and a plurality of data elements, wherein the annotation information comprises a plurality of annotation entries corresponding to at least one data element from the plurality of data elements, and wherein the plurality of annotation entries are entered based on an annotation guideline;
    determining a quality rating for the annotation guideline, wherein the determining is based on a comparison between a first value associated with the plurality of annotators and the plurality of data elements and a second value associated with any disparity among the plurality of annotation entries;
    determining a proficiency rating for an annotator from the plurality of annotators, wherein the determining is based on a comparison between a third value associated with annotation entries by the annotator and the second value associated with any disparity among the plurality of annotation entries;
    determining the quality rating is below a threshold value and the proficiency rating is below another threshold value;
    generating a report based on the determination that the quality rating is below a threshold value and the proficiency rating is below another threshold value; and
    generating a plurality of annotation type tables based on the plurality of annotation entries, wherein the plurality of annotation entries comprises multiple types of annotation entries, and wherein each of the plurality of annotation type tables corresponds to one of the multiple types of annotation entries;
    generating a plurality of score tables based on the plurality of annotation type tables comprising a plurality of element scores, wherein each element score from the plurality of element scores is associated with a particular data element from the plurality of data elements and is based on whether an annotation has been entered for the particular data element by each annotator from the plurality of annotators;
    based on the quality rating, and the proficiency rating and a quality associated with the plurality of annotation entries, detecting whether the annotation guideline has a low quality level based on the determination that the quality rating is below the threshold value and whether one or more annotators has a low proficiency level based on the determination that the proficiency rating is below the other threshold value; in response to detecting the low proficiency level for the one or more annotators, providing in the generated report training information to the one or more annotators, wherein the training information indicates an annotation type of annotation of which has been added by annotators belonging to a majority to each of tokens corresponding to annotating by a specific annotator belonging to a minority; and
    in response to detecting the low quality level for one or more annotation guidelines generating providing in the generated report information for revising the one or more annotation guidelines, wherein the information generated indicates a number of annotators who have added the annotation of each annotation type to tokens corresponding to annotating by any of the annotators belonging to a minority or indicating easily-confused pairs of annotation types.

2. The method according to claim 1, further comprising: determining whether an annotation has been entered for each data element from the plurality of data elements by each annotator from the plurality of annotators.

3. The method according to claim 1, wherein determining the quality rating comprises determining a ratio between the first value and the second value, and wherein determining the proficiency rating comprises determining a ratio between the second value and the third value.

4. The method according to claim 1, wherein the first value, the second value, and the third value are based on the plurality of score tables.

5. The method according to claim 1, wherein each score table from the plurality of score tables comprises a plurality of cells corresponding to a first data element and each annotator from the plurality of annotators, wherein each cell from the plurality of cells has a value based on whether an annotation has been entered for the first data element by each annotator from the plurality of annotators, and wherein the element score for the first data element is based on a difference between a number of cells from the plurality of cells having a first cell value and a number of cells from the plurality of cells having a second cell value.

6. A computer program product for evaluating and providing annotation quality, the computer program product comprising at least one computer readable non-transitory storage medium having computer readable program instructions thereon for execution by a processor, the computer readable program instructions comprising program instructions for:
    obtaining annotation information associated with a plurality of annotators and a plurality of data elements, wherein the annotation information comprises a plurality of annotation entries corresponding to at least one data element from the plurality of data elements, and wherein the plurality of annotation entries are entered based on an annotation guideline;
    determining a quality rating for the annotation guideline, wherein the determining is based on a comparison between a first value associated with the plurality of annotators and the plurality of data elements and a second value associated with any disparity among the plurality of annotation entries;

determining a proficiency rating for an annotator from the plurality of annotators, wherein the determining is based on a comparison between a third value associated with annotation entries by the annotator and the second value associated with any disparity among the plurality of annotation entries;

determining the quality rating is below a threshold value and the proficiency rating is below another threshold value;

generating a report based on the determination that the quality rating is below a threshold value and the proficiency rating is below another threshold value; and generating a plurality of annotation type tables based on the plurality of annotation entries, wherein the plurality of annotation entries comprises multiple types of annotation entries, and wherein each of the plurality of annotation type tables corresponds to one of the multiple types of annotation entries;

generating a plurality of score tables based on the plurality of annotation type tables comprising a plurality of element scores, wherein each element score from the plurality of element scores is associated with a particular data element from the plurality of data elements and is based on whether an annotation has been entered for the particular data element by each annotator from the plurality of annotators;

based on the quality rating, and the proficiency rating and a quality associated with the plurality of annotation entries, detecting whether the annotation guideline has a low quality level based on the determination that the quality rating is below the threshold value and whether one or more annotators has a low proficiency level based on the determination that the proficiency rating is below the other threshold value;

in response to detecting the low proficiency level for the one or more annotators, providing in the generated report training information to the one or more annotators, wherein the training information indicates an annotation type of annotation of which has been added by annotators belonging to a majority to each of tokens corresponding to annotating by a specific annotator belonging to a minority; and in response to detecting the low quality level for one or more annotation guidelines generating providing in the generated report information for revising the one or more annotation guidelines, wherein the information generated indicates a number of annotators who have added the annotation of each annotation type to tokens corresponding to annotating by any of the annotators belonging to a minority or indicating easily-confused pairs of annotation types.

7. The computer program product according to claim 6, further comprising program instructions for: determining whether an annotation has been entered for each data element from the plurality of data elements by each annotator from the plurality of annotators.

8. The computer program product according to claim 6, wherein determining the quality rating comprises determining a ratio between the first value and the second value, and wherein determining the proficiency rating comprises determining a ratio between the second value and the third value.

9. A computer system for evaluating and providing annotation quality, the computer system comprising: at least one processing unit; at least one computer readable memory; at least one computer readable tangible, non-transitory storage medium; and program instructions stored on the at least one computer readable tangible, non-transitory storage medium for execution by the at least one processing unit via the at least one computer readable memory, wherein the program instructions comprise program instructions for:

obtaining annotation information associated with a plurality of annotators and a plurality of data elements, wherein the annotation information comprises a plurality of annotation entries corresponding to at least one data element from the plurality of data elements, and wherein the plurality of annotation entries are entered based on an annotation guideline;

determining a quality rating for the annotation guideline, wherein the determining is based on a comparison between a first value associated with the plurality of annotators and the plurality of data elements and a second value associated with any disparity among the plurality of annotation entries;

determining a proficiency rating for an annotator from the plurality of annotators, wherein the determining is based on a comparison between a third value associated with annotation entries by the annotator and the second value associated with any disparity among the plurality of annotation entries; determining the quality rating is below a threshold value and the proficiency rating is below another threshold value;

generating a report based on the determination that the quality rating is below a threshold value and the proficiency rating is below another threshold value; and generating a plurality of annotation type tables based on the plurality of annotation entries, wherein the plurality of annotation entries comprises multiple types of annotation entries, and wherein each of the plurality of annotation type tables corresponds to one of the multiple types of annotation entries;

generating a plurality of score tables based on the plurality of annotation type tables comprising a plurality of element scores, wherein each element score from the plurality of element scores is associated with a particular data element from the plurality of data elements and is based on whether an annotation has been entered for the particular data element by each annotator from the plurality of annotators;

based on the quality rating, and the proficiency rating and a quality associated with the plurality of annotation entries, detecting whether the annotation guideline has a low quality level based on the determination that the quality rating is below the threshold value and whether one or more annotators has a low proficiency level based on the determination that the proficiency rating is below the other threshold value;

in response to detecting the low proficiency level for the one or more annotators, providing in the generated report training information to the one or more annotators, wherein the training information indicates an annotation type of annotation of which has been added by annotators belonging to a majority to each of tokens corresponding to annotating by a specific annotator belonging to a minority; and in response to detecting the low quality level for one or more annotation guidelines generating providing in the generated report information for revising the one or more annotation guidelines, wherein the information generated indicates a number of annotators who have added the annotation of each annotation type to tokens corresponding to annotating by any of the annotators belonging to a minority or indicating easily-confused pairs of annotation types.

10. The computer system according to claim 9, further comprising program instructions for: determining whether an annotation has been entered for each data element from the plurality of data elements by each annotator from the plurality of annotators.

11. The computer system according to claim 9, wherein determining the quality rating comprises determining a ratio between the first value and the second value, and wherein determining the proficiency rating comprises determining a ratio between the second value and the third value.

* * * * *